United States Patent [19]

Bialous, deceased et al.

[11] 4,197,384

[45] Apr. 8, 1980

[54] STABILIZED POLYCARBONATE COMPOSITIONS

[75] Inventors: Charles A. Bialous, deceased, late of Hancock, Mass.; by Edwin E. Reder, administrator, Pittsfield, Mass.; Howard A. Vaughn, Jr., Schenectady, N.Y.; Joseph B. Williams, Mt. Vernon, Ind.

[73] Assignee: General Electric Company, Pittsfield, Mass.

[21] Appl. No.: 865,295

[22] Filed: Dec. 28, 1977

[51] Int. Cl.$^2$ ............... C08L 69/00; C08L 83/06
[52] U.S. Cl. ............... 525/464; 260/45.7 R; 260/29.1 SB; 260/45.7 P; 525/1; 525/2
[58] Field of Search ....... 260/824 R, 47 XA, 29.1 SB, 260/45.7 R; 528/197

[56] References Cited

U.S. PATENT DOCUMENTS

| | | | |
|---|---|---|---|
| 2,999,835 | 9/1961 | Goldberg | 260/824 R |
| 3,028,365 | 4/1962 | Schnell et al. | 260/47 XA |
| 3,087,908 | 4/1963 | Caird | 260/824 R |
| 3,169,121 | 2/1965 | Goldberg | 260/47 XA |
| 3,305,520 | 2/1967 | Fritz et al. | 260/45.7 |
| 3,334,154 | 8/1967 | Kim | 260/860 |
| 3,335,211 | 8/1967 | Mead et al. | 260/824 R |
| 3,673,146 | 6/1972 | Factor | 260/37 PC |
| 3,729,440 | 4/1973 | Liberty | 260/45.7 P |
| 3,971,756 | 7/1976 | Bialous et al. | 260/824 R |
| 4,066,611 | 1/1978 | Axelrod | 260/45.7 R |

*Primary Examiner*—Wilbert J. Briggs, Sr.
*Attorney, Agent, or Firm*—Morgan, Finnegan, Pine, Foley & Lee

[57] ABSTRACT

A thermal oxidative stabilized polycarbonate composition comprises in admixture (a) a high molecular weight aromatic carbonate polymer and (b) a minor amount of an oligomeric or polymeric hydrocarbonoxy siloxane and, optionally, an organophosphite or organophosphonite and/or an epoxy compound.

14 Claims, No Drawings

STABILIZED POLYCARBONATE COMPOSITIONS

This invention relates to a thermal oxidative stabilized polycarbonate composition comprising in admixture (a) a high molecular weight aromatic carbonate polymer and (b) hydrocarbonoxy siloxane and, optionally, further including a minor amount of a phosphite or phosphonite and/or an epoxy compound.

BACKGROUND OF THE INVENTION

Polycarbonate polymers are excellent molding materials as products made therefrom have high impact strength, toughness, high transparency, wide temperature limits (high impact resistance below $-60°$ C. and a UL thermal endurance rating of $115°$ C. with impact), good dimensional stability, high creep resistance and electrical properties which qualify them as sole supports for current carrying parts.

Polycarbonates are, however, very difficult to fabricate from melts for the reason that the high temperatures required lead to thermal and oxidative degradation. This is especially aggravated in pigmented, e.g., titanium dioxide-containing, modifications. Degradation results in increases in melt viscosity and development of undesirable color. In the past, much effort has been expended in preparing thermally stable polycarbonate compositions which would be color stable at elevated temperatures and particularly at the high molding temperatures generally employed to prepare molded polycarbonate articles. Many different additives have been found that are quite suitable for rendering polycarbonates heat and color stable. Particularly useful are triorgano-phosphites which have been disclosed in U.S. Pat. No. 3,305,520. Also, U.S. Pat. No. 3,729,440 discloses a thermally stable aromatic polycarbonate containing a phosphonite and an epoxy compound. Further, U.S. Pat. No. 3,673,146 discloses a method for stabilizing polycarbonate resin involving using a triorganophosphite, cycloaliphatic epoxy compound, ultramarine pigment and aryl siloxane fluid. Although phosphites alone appear to have an advantageous stabilizing effect, in general, higher than desirable amounts are necessary. Furthermore, it is known from Caird, U.S. Pat. No. 3,087,908, assigned to the assignee herein, that polycarbonates can be admixed with polydiorganosiloxanes to produce melt processed materials which are free from blemishes, undesirable color effects, bubbles and craters. However, there is no suggestion that thermal oxidative stability can be improved by this expedient, especially when pigments are also present.

It has now been discovered that minor effective amounts of oligomeric or polymeric hydrocarbonoxysiloxanes are remarkably effective per se and in combination with organic phosphites and phosphonites and/or organic epoxide compounds to improve the thermal oxidative stability of aromatic polycarbonate resins. In contrast to the additives of Caird, incorporated herein by reference, the superiority of those herein is believed to be due to the unique presence of silicon bonded active hydrocarbonoxy groups—which confers anti-oxidant-thermal stabilizing properties in the additive.

DESCRIPTION OF THE INVENTION

According to this invention there are provided stabilized thermoplastic compositions comprising in adixture (a) a high molecular weight aromatic carbonate polymer and a minor amount of (b) an oligomeric or polymeric hydrocarbonoxysiloxane.

In the practice of this invention, the hydrocarbonoxy siloxane can vary broadly in structure. The only requirements are that it have at least one Si—O—Si linkage and at least one R—O—Si— bond. The number of repeating units can vary from about 2 to about 500. The hydrocarbonoxy group can contain from about 1 to about 100 carbon atoms and it can be straight chained or branched or cyclic. It can be aliphatic, unsaturated, or aromatic in character and can be partially aliphatic, partially aromatic, and the like. The remaining valences of silicon can be satisfied by any of the well known substituents, e.g., R—Si— bonds, wherein R is alkyl, aryl, aralkyl, alkaryl groups, as well as unsaturated or inert-substituted such groups, and the like.

Preferably, component (b) is of the formula

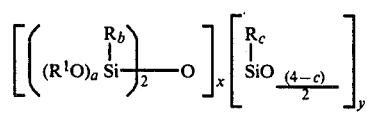

wherein R and $R^1$ are selected from monovalent hydrocarbon radicals and such radicals substituted with one or more inorganic atoms or radicals, a is an integer of from 1 to 3 inclusive, b is 0 or an integer from 1 to 2, c is 0 or an integer of from 1 to 3, x is from 1 to 100, y is 0 or from 1 to 198 and the sum of x and y is equal to 1 to 199 inclusive.

The amount of hydrocarbonoxysiloxane employed in the practice of this invention may vary from about 0.001 to about 10.0, preferably 0.005 to 5.0 parts by weight per hundred parts of aromatic carbonate polymer.

The radicals R and $R^1$ can be, for example, alkyl radicals, such as methyl, ethyl, propyl, butyl, pentyl, hexyl, heptyl, octyl, and the like, cycloalkyl radicals, such as cyclohexyl, cycloheptyl, and the like, aryl radicals, such as phenyl, tolyl, xylyl, and the like, aralkyl radicals, such as benzyl, phenylethyl, phenylpropyl, and the like, such radicals substituted by one or more inorganic atoms or radicals, e.g., halogenated radicals of the aforementioned type such as chloromethyl, chloropropyl, chlorophenyl, dibromophenyl, nitrophenyl, and the like. In component (b), where R and $R^1$ can represent more than one radical, these can all be the same or they can be any two or more of the aforementioned. Among the compounds embraced by the formula are oligomeric, e.g., those of up to about 10 SiO— containing units and polymeric, e.g., those of up to about 500 —SiO— containing units, respectively. Representative oligomeric compounds are: 1,3-dimethyltetramethoxydisiloxane; 1,3-diphenyltetraethoxysiloxane; hexamethoxydisiloxane; 1,3-dimethoxytetraphenyldisiloxane; 1,3,5-trimethoxy-1,3,5-trimethylcyclotrisiloxane; 1,3,5,7-tetramethoxy-1,3,5,7-tetramethylcyclotetrasiloxane; dodecaethoxypentasiloxane, a pentamer made by partial hydrolysis of ethyl orthosilicate and the like.

Preferred members of the family of polyorganohydrocarbonoxysiloxanes comprise units of Formula I:

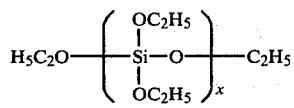

wherein x is from about 2 to about 10.

Also preferred are siloxanes of Formula II:

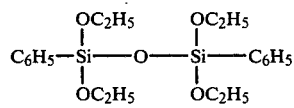

Component (b) can be made by procedures known to those skilled in the art. For example concurrent hydrolysis/alcoholysis of methyltrichlorosilane by treatment with a blend of water and methanol will yield α,ω-bis-methyldimethoxypolymethyl methoxysiloxane. Hydrolysis/alcoholysis of methyltrichlorosilane with a blend of water and methanol containing less water, followed by distillation, will provide dimethyltetramethoxydisiloxane. Partial hydrolysis of a methyltrichlorosilane and reaction with methanol will also provide linear and cyclic methoxymethylsiloxanes. Hydrolyzing/alcoholyzing a mixture of methyltrichlorosilane and dimethyldichlorosilane with a blend of water and methanol will provide cyclic copolymeric siloxanes having methoxy-silicone bonds. As is obvious, any conventional chain terminating group can also be introduced to end-cap the linear polymers.

The high molecular weight aromatic polycarbonates that can be employed herein as component (a) are homopolymers and copolymers and mixtures thereof which have an intrinsic viscosity (I.V.) of 0.40 to 1.0 dl./g. as measured in methylene chloride at 25° C. that are prepared by reacting a dihydric phenol with a carbonate precursor. Typical of some of the dihydric phenols that may be employed in the practice of this invention are bisphenol A, (2,2-bis(4-hydroxyphenyl) propane), bis(4-hydroxyphenyl) methane, 2,2-bis(4-hydroxy-3-methylphenyl) propane, 4,4-bis(4-hydroxyphenyl) heptane, 2,2-(3,5,3',5'-tetrachloro-4,4'-dihydroxydiphenyl) propane, 2,2-(3,5,3',5'-tetrabromo-4,4'-dihydroxydiphenyl) propane, (3,3'-dichloro-4,4'-dihydroxydiphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di(chlorophenyl) carbonate, di(bromophenyl)di(trichlorophenyl) carbonate, di-(tribromophenyl) carbonate, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers used in this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed to make component (a) can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also contemplated as component (a) are branched polycarbonates wherein a polyfunctional aromatic compound is reacted with the dihydric phenol and carbonate precursor to provide a thermoplastic randomly branched polycarbonate.

Such polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acids or their haloformyl derivatives.

Contemplated as component (a) are blends of a linear polycarbonate and a branched polycarbonate.

Thoe embodiments of this invention which further include component (c), an organophosphite or organophosphonite co-stabilizer, can employ one or more compounds of the formulae:

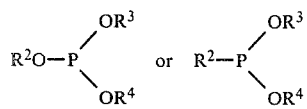

wherein $R^2$, $R^3$ and $R^4$ are independently selected from hydrogen, alkyl, aryl, cycloalkyl, aralkyl and alkylaryl radicals wherein at least one R is other than hydrogen. Preferably, the radicals have 1 to 20 carbon atoms. The alkyl may be methyl, ethyl, propyl, isopropyl, the various butyl isomers, e.g., butyl, sec-butyl, tert-butyl, the various amyl isomers, the various hexyl isomers, the various nonyl isomers, the various eicosyl isomers, etc.; the cycloalkyl may be cyclobutyl, cyclohexyl, 2-methylcyclohexyl, 4-methylcyclohexyl, 2-ethylcyclohexyl, 4-ethylcyclohexyl, 4-isopropylcyclohexyl, etc.; the aryl may be phenyl, 1-naphthyl, 2-naphthyl, biphenylyl, terphenylyl, etc.; the aralkyl may be any of the above alkyl substituted with one or more of the above aryl grups, e.g., benzyl, phenylethyl, 1-phenylpropyl, etc.; and the alkaryl may be any of the above aryls substituted with one or more of the above alkyls, e.g., o-tolyl, xylyl, cumyl, mesityl, butylphenyl, nonylphenyl, etc. Typical of some of the phosphites that can be employed in the practice of this invention are diphenyldodecylphosphite, diphenylpentraerythritol diphosphite, triphenylphosphite, di-(t-butylphenyl) octylphosphite, tris(nonylphenyl) phosphite, dipropylphenylphosphite, etc. The phosphonites includes phenyl diphenylphosphonite and diphenylpentaerythritol diphosphonite. The preferred phosphites to be employed herein are triorgano phosphites, e.g., tris(p-nonylphenyl) phosphite, tridecylphosphite, etc., diaryl alkyl phosphites, e.g., diphenyldecylphosphite, etc.

A family of useful phosphites and phosphonites is derived from pentaerythritol and is of the formulae:

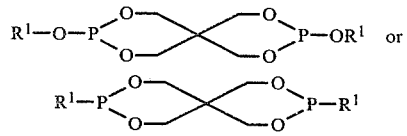

wherein $R^1$ is, independently, alkyl, aryl, cycloalkyl, aralkyl or alkaryl.

The phosphites and phosphonites can be easily prepared, e.g., by reacting the corresponding carbinol with phosphorous trichloride, preferably in the presence of an acid acceptor, to produce the phosphite, or with the corresponding dichlorophosphine produce the phosphonite. These compounds are also commercially available, e.g., tris(nonylphenyl) phosphite from Goodyear Co., under the name Polygard.

The amount of component (c) to be used can vary broadly, but preferably it will be in the range of from about 0.005 to about 1.0 parts by weight per 100 parts by weight of aromatic carbonate polymer (a), and preferably from about 0.05 to about 0.25 parts by weight.

The co-stabilizing epoxy compounds which can be employed as component (d) are selected from the following:

I. Derivatives of epoxy ethane represented by the following formula:

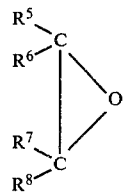

wherein $R^5$, $R^6$, $R^7$ and $R^8$ are independently hydrogen, alkyl radicals of 1–24 carbon atoms, aryl of 6–24 carbon atoms, —$CH_2OR'$, —$CH_2OCOR'$, —$CH_2OCOR'X$, —'$COOCH_2X$, —$CH_2OR''OCH_2X$ wherein R' is alkyl of 1–24 carbon atoms or aryl of 6 to 24 carbon atoms and wherein R'' is alkylene of 1–24 carbon atoms and X is an oxirane ring.

II. Derivatives of epoxy cyclohexane represented by the following formula:

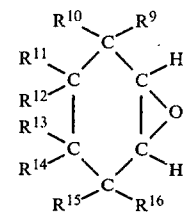

wherein $R^9$ through $R^{16}$ are independently selected from hydrogen, alkyl of 1–24 carbon atoms, —$COOR^{17}$, —$OCOR^{17}$, —$COOR^{18}X$, —$OCOR^{18}$—$COOX$ wherein $R^{17}$ is alkyl of 1–24 carbon atoms and $R^{18}$ is alkylene of 1–24 carbon atoms and X is an oxirane ring.

While the actual number of hydrogen atoms employed may vary, it should be a function of the volatility of the epoxy compound. The number of hydrogen atoms should be such as to minimize the volatility of the epoxy compound since if the epoxy compound were to volatize at a low temperature, its benefit in use with a polycarbonate would be lost at the molding temperatures employed in preparing molded articles from the composition of this invention.

The amount of epoxy employed can vary from 0.01 to 0.5 weight percent based on the weight of the polymer composition and is preferably 0.03 to 0.3 weight percent. While more than 0.5 weight percent of epoxy can be employed, it has been found that higher amounts tend to degrade the physical properties of the polycarbonate and thereby reduce the usefulness of the polymer in providing tough, flexible molded articles.

Typical epoxy compounds are 3,4-epoxycyclohexylmethyl 3,4-epoxycyclohexane carboxylate, 3,4-epoxy-6-methylcyclohexylmethyl, 3,4-epoxy-6-methycyclohexane carboxylate, 2,3-epoxycyclohexylmethyl 3,4-epoxycyclohexane carboxylate, 4-(3,4-epoxy-4-methylcyclohexyl)butyl-3,4-epoxycyclohexane carboxylate, 3,4-epoxycyclohexyl ethyleneoxide, cyclohexyl 3,4-epoxycyclohexane carboxylate, 3,4-epoxy-6-methylcyclohexylmethyl 6-methylcyclohexyl carboxylate, bisphenol-A diglycidyl ester, tetrabromobisphenol-A diglycidyl ether, di-glycidyl ester of phthalic acid, diglycidyl ester of hexahydrophthalic acid, epoxidized soybean oil, epoxidized linseed oil, bisepoxycyclohexyl adipate, butadiene diepoxide, tetraphenylethyleneepoxide, octyl epoxy tallate and epoxidized polybutadiene. Also, 3,4-dimethyl-1,2-epoxycyclohexane, 3,5-dimethyl 1,2-epoxy cyclohexane, 3-methyl-5-tert butyl-1,2-epoxy cyclohexan octadecyl 2,2-dimethyl-3,4-epoxycyclohexane carboxylate, cyclohexyl 2-methyl-3,4-epoxycyclohexane carboxylate, N-butyl 2-isopropyl-3,4-epoxy-5-methylcyclohexane carboxylate, octadecyl-3,4-epoxycyclohexane carboxylate, 2-ethylhexyl 3',4'-epoxycyclohexane carboxylate, 4,6-dimethyl 2,3-epoxycyclohexyl 3',4'-epoxycyclohexane carboxylate, diethyl 4,5-epoxy-cis-1,2-cyclohexane dicarboxylate, di-n-butyl 3-tert-butyl-4,5-epoxy-cis-1,2-cyclohexane dicarboxylate. Preferably, the epoxy compound is 3,4-epoxycyclohexylmethyl 3,4-epoxycyclohexane carboxylate.

As has been mentioned, pigmented polycarbonates are particularly difficult to stabilize. Among the pigments that are used can be mentioned fine particles of titanium dioxide, zinc oxide, zinc sulfide, basic lead carbonate, antimony oxide, zirconium oxide, potassium litanate, the so-called white (hiding pigments) and colored pigments, e.g., ultramarine blue, chromium oxide, and the like. The pigments are conventionally employed in amounts of about 0.001 to about 10 percent by weight. This invention is especially useful to protect pigmented polycarbonate compositions wherein the pigment is titanium dioxide. Titanium dioxide is generally used at levels of from about 0.1 to about 3 parts by weight per 100 parts by weight of aromatic carbonate resin.

The compositions of the instant invention may be prepared by blending the high molecular weight aromatic polycarbonate with the additive by conventional methods.

Obviously, other materials can also be employed with the aromatic carbonate polymers of this invention and include such materials as anti-static agents, ultraviolet stabilizers, reinforcing fillers and the like.

DESCRIPTION OF THE PREFERRED EMBODIMENT

The following examples are illustrative, but not limiting.

EXAMPLES 1-2

A polycarbonate comprising a homopolymer of 2,2-bis(4-hydroxyphenyl)propane (bisphenol A) is prepared by reacting essentially equimolar amounts of bisphenol A and phosgene in an aqueous organic medium with triethylamine, sodium hydroxide, and phenol under conditions known per se. The polycarbonate resin is blended with 1% by weight of the respective oligomeric and dimeric hydrocarbonoxysiloxanes and extruded into pellets at 550°–600° F. Such pellets can be injection molded into test samples of about 3 inches by 2 inches by $\frac{1}{8}$" thick at 600° F., 650° F. and 700° F. Stability to discoloration can be measured in accordance with ASTM Yellowness Index Test D 1925. The impact strength can be measured by the Izod Test, ASTM D-256 on molded specimens about $2\frac{1}{2}$"×$\frac{1}{2}$"×$\frac{1}{8}$". Other portions can be fed into a plastometer and the flow rate of the composition is measured according to ASTM D 1238-70, Condition O. The formulations employed are set forth in the Table 1:

Table 1

| Compositions Comprising Aromatic Polycarbonate and Hydrocarbonoxy Siloxane | | | |
|---|---|---|---|
| Example | 1A* | 1 | 2 |
| Composition (parts by wt.) | | | |
| Poly 2,2-bis(4-hydroxy phenyl)propane carbonate | 100 | 99.0 | 99.0 |
| 1,3-diphenyltetraethoxy disiloxane | — | 1.0 | — |
| pentamer of partial hydrolyzate of ethyl orthosilicate[a] | — | — | 1.0 |

*Control
[a]ES-40, Union Carbide.

EXAMPLE 3

The procedure of Example 1 is repeated, using 0.04 parts by weight of 1,1,3,3-tetraethoxy-1,3-diphenyl-disiloxane. The formulation used and the results obtained are set forth in Table 2 as follows:

Table 2

| Composition Comprising Aromatic Polycarbonate and Hydrocarbonoxy Siloxane | | |
|---|---|---|
| Example | 3A* | 3 |
| Composition (parts by wt.) | | |
| Poly 2,2-bis(4-hydroxy phenyl)propane carbonate | 100 | 99.60 |
| 1,3-diphenyltetraethoxy disiloxane | — | 0.4 |
| Properties | | |
| Yellowness index: | | |
| 600° F. | 1.0 | 0.7 |
| 650° F. | 2.0 | 1.5 |
| 700° F. | 15.6 | 11.8 |
| KI,melt viscosity (centiseconds) | 5820 | 6030 |

*Control

The compositions according to this invention exhibit less yellowness and less degradation after molding at high temperatures.

Obviously, many variations are possible in light of the above-detailed description. For example, instead of the polycarbonate used, a copolymer can be employed which is derived from bisphenol-A and tetrabromobisphenol-A. Moreover, to the composition can be added 2 parts by weight of titanium dioxide pigment per 100 parts by weight of component (a). Also, diphenyloctyl phosphite, tris(nonylphenyl) phosphite and phenyl-didecylphosphonite, and 3,4-epoxycyclohexylmethyl 3,4-epoxycyclohexane carboxylate can also be present as stabilizers. All such obvious variations are within the full intended scope of the appended claims:

What is claimed is:
1. A stabilized thermoplastic composition comprising in admixture (a) a high molecular weight aromatic carbonate polymer and a minor amount of (b) an oligomeric or polymeric hydrocarbonoxy siloxane.
2. A composition as defined in claim 1 wherein component (b) is present in an amount of from about 0.001 to about 10.0 parts by weight per hundred parts by weight of aromatic carbonate polymer (a).
3. A composition as defined in claim 1 wherein component (b) is present in an amount of from about 0.01 to about 5.0 parts by weight per hundred parts by weight of aromatic carbonate polymer (a).

4. A composition as defined by claim 1 wherein the aromatic carbonate polymer component (a) is derived from bisphenol-A.

5. A composition as defined in claim 1 wherein the aromatic carbonate polymer component (a) is a copolymer derived from bisphenol-A and tetrabromobisphenol-A.

6. A composition as defined in claim 1 wherein component (b) comprises units of the formula:

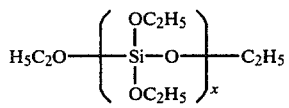

wherein x is from about 2 to about 10.

7. A composition as defined in claim 6 wherein x is about 5.

8. A composition as defined in claim 1 wherein component (b) is of the formula

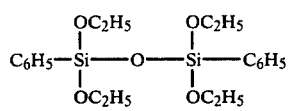

9. A composition as defined in claim 1 which further includes a pigments.

10. A composition as defined in claim 9 wherein said pigment is titanium dioxide.

11. A composition as defined in claim 1 which further includes a stabilizing amount of (c) an organophosphite or organophosphonite of the formulae:

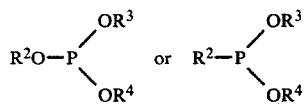

wherein $R^2$, $R^3$ and $R^4$ are independently selected from hydrogen, alkyl, aryl, cycloalkyl, aralkyl and alkylaryl radicals wherein at least one such R is other than hydrogen.

12. A composition as defined in claim 11 wherein the amount of stabilizer (c) comprises from about 0.005 to about 1.0 parts by weight based on 100 parts by weight of aromatic carbonate polymer (a).

13. A composition as defined in claim 1 which further includes a stabilizing amount of (d) an epoxy compound selected from the following:

I. Derivatives of epoxy ethane represented by the following formula:

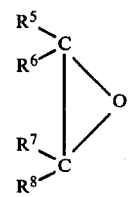

wherein $R^5$, $R^6$, $R^7$ and $R^8$ are independently hydrogen, alkyl of 1–24 carbon atoms, aryl of 6–24 carbon atoms, $—CH_2OR'$, $—CH_2OCOR'$ $—CH_2OCOR'X$, $—'COOCH_2X$, or $—CH_2OR''OCH_2X$, wherein R' is alkyl of 1–24 carbon atoms or aryl of 6 to 24 carbon atoms and wherein R'' is alkylene of 1–24 carbon atoms and X is an oxirane ring and II. Derivatives of epoxy cyclohexane represented by the following formula:

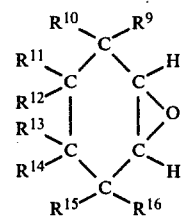

wherein $R^9$ through $R^{16}$ are independently selected from hydrogen, alkyl of 1–24 carbon atoms, $—COOR^{17}$, $—OCOR^{17}$, $—COOR^{18}X$, or $—OCOR^{18}—COOX$ wherein $R^{17}$ is alkyl of 1–24 carbon atoms and $R^{18}$ is alkylene of 1–24 carbon atoms and X is an oxirane ring.

14. A composition as defined in claim 13 which further includes a stabilizing amount of an organophosphite or organophosphonite of the formulae:

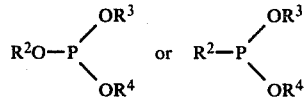

wherein $R^2$, $R^3$ and $R^4$ are independently selected from hydrogen, alkyl, aryl, cycloalkyl, aralkyl and alkylaryl radicals wherein at least one such R is other than hydrogen.

* * * * *